United States Patent [19]
Kane et al.

[11] Patent Number: 5,540,493
[45] Date of Patent: Jul. 30, 1996

[54] ENCAPSULATED SHELF WITH PRE-ENCAPSULATED BRACKET

[75] Inventors: Edmund J. Kane, Holland; Robert S. Herrmann, Grand Haven; Craig S. Bienick, Jenison; Gregory T. Wolters, Holland, all of Mich.

[73] Assignees: Donnelly Technology Inc., Holland, Mich.; Gemtron Corporation, Sweetwater, Tenn.

[21] Appl. No.: 300,967

[22] Filed: Sep. 6, 1994

Related U.S. Application Data

[63] Continuation-in-part of Ser. No. 665,661, Mar. 7, 1991, Pat. No. 5,362,145, and a continuation-in-part of Ser. No. 241,133, May 10, 1994.

[51] Int. Cl.⁶ .................................................. A47B 96/04
[52] U.S. Cl. .......................................... 312/408; 311/153
[58] Field of Search ..................................... 312/400, 401, 312/408; 108/152, 107, 108; 211/153, 186, 90

[56] References Cited

U.S. PATENT DOCUMENTS

| | | |
|---|---|---|
| 786,935 | 4/1905 | Wright . |
| 1,779,236 | 10/1930 | Hoegger . |
| 2,144,602 | 1/1939 | Balmer . |
| 2,169,295 | 8/1939 | Shuart . |
| 2,517,725 | 8/1950 | Schweller . |
| 2,604,375 | 7/1952 | Beckett . |
| 2,876,910 | 3/1959 | Morton, Jr. . |
| 3,234,897 | 2/1966 | Berk . |
| 3,331,646 | 7/1967 | Peters . |
| 3,603,274 | 9/1971 | Ferdinand . |
| 3,604,669 | 9/1971 | Asher . |
| 3,633,983 | 1/1972 | Whitcomb . |
| 3,672,624 | 6/1972 | Keller . |
| 3,984,163 | 10/1976 | Booman, Jr. et al. . |
| 4,015,543 | 4/1977 | Stankowitz . |
| 4,603,781 | 8/1986 | Ryan, Jr. . |
| 4,723,809 | 2/1988 | Kida et al. . |
| 4,729,613 | 3/1988 | Tromble et al. . |
| 4,735,470 | 4/1988 | Falk . |
| 4,779,939 | 10/1988 | Stich . |
| 4,841,698 | 6/1989 | Gold . |
| 4,870,907 | 10/1989 | McKee . |
| 4,890,746 | 1/1990 | Trulaske, Sr. . |
| 4,923,260 | 5/1990 | Poulsen . |
| 4,934,541 | 6/1990 | Bussan et al. . |
| 5,004,202 | 4/1991 | Stumpf et al. . |

FOREIGN PATENT DOCUMENTS

| | | |
|---|---|---|
| 711879 | 6/1965 | Canada . |
| 711920 | 9/1941 | Germany . |
| 85357952 | 9/1986 | Germany . |
| 90065131 | 9/1990 | Germany . |
| 90041801 | 9/1991 | Germany . |

*Primary Examiner*—Kenneth J. Dorner
*Assistant Examiner*—Gerald A. Anderson
*Attorney, Agent, or Firm*—Van Dyke, Gardner, Linn & Burkhart, LLP

[57] ABSTRACT

An encapsulated shelf with pre-encapsulated bracket, and preferably adapted for use in refrigeration and/or freezer compartments, includes a glass or other panel supported by a support such as a bracket having a cover encapsulating a substantial majority thereof and a flange extending into and interconnecting with a rim formed separately from the panel and around an edge of the panel. The rim and cover preferably engage and cooperate with one another. A slide rail may be integrally formed in one piece with the encapsulating cover. The support includes holes extending through the support for mechanical interconnection with the rim and cover. The support may also be provided with a mounting portion adapted to couple with a refrigerator wall or the like at a variety of vertical locations. The rim may further define a spill dam to contain spills on the panel surface, while additional brackets or stiffeners may be included for extra wide shelves.

40 Claims, 7 Drawing Sheets

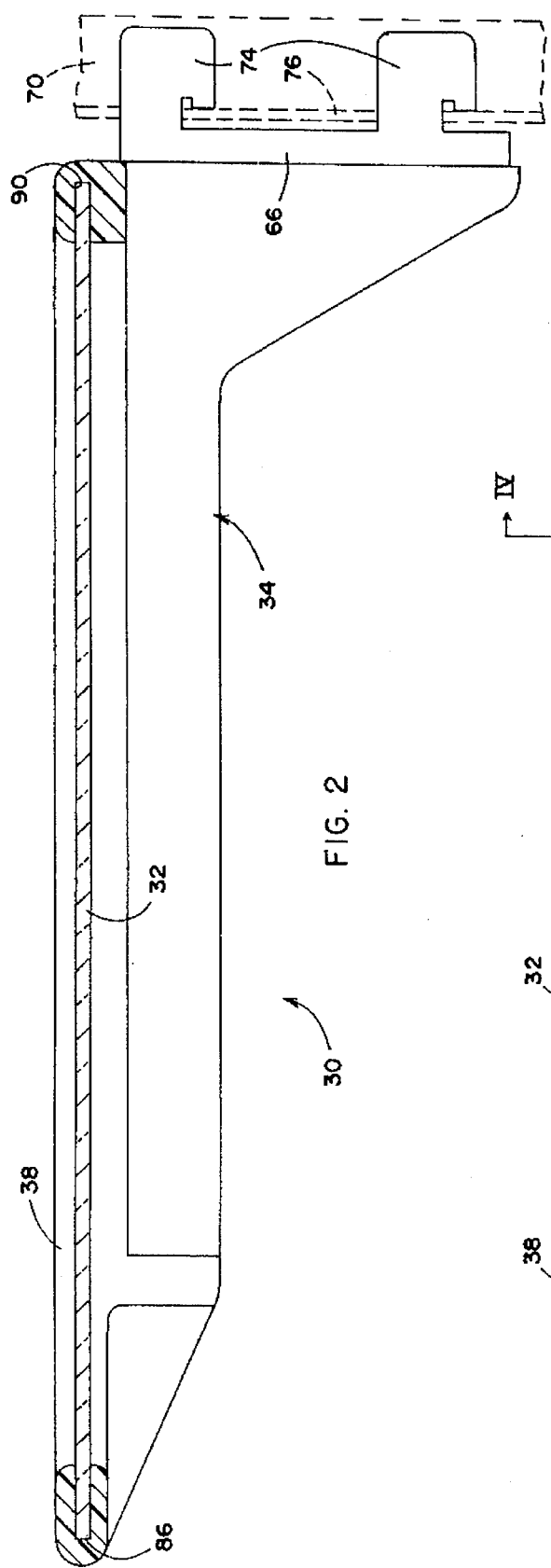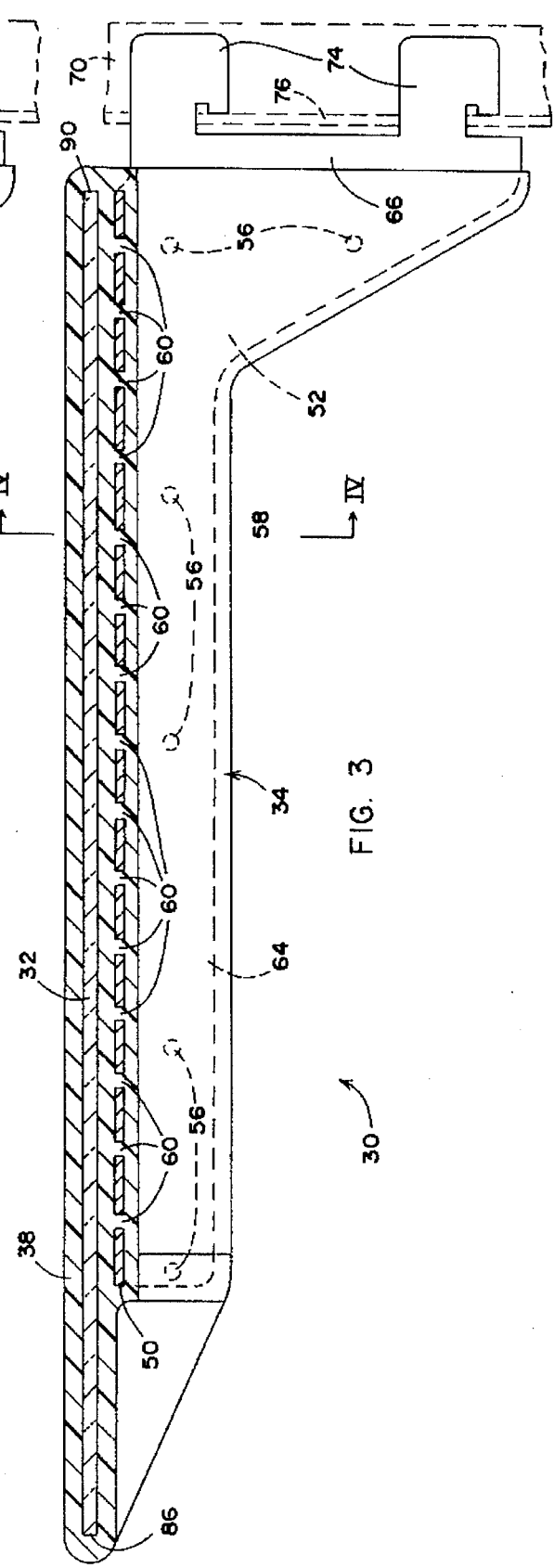

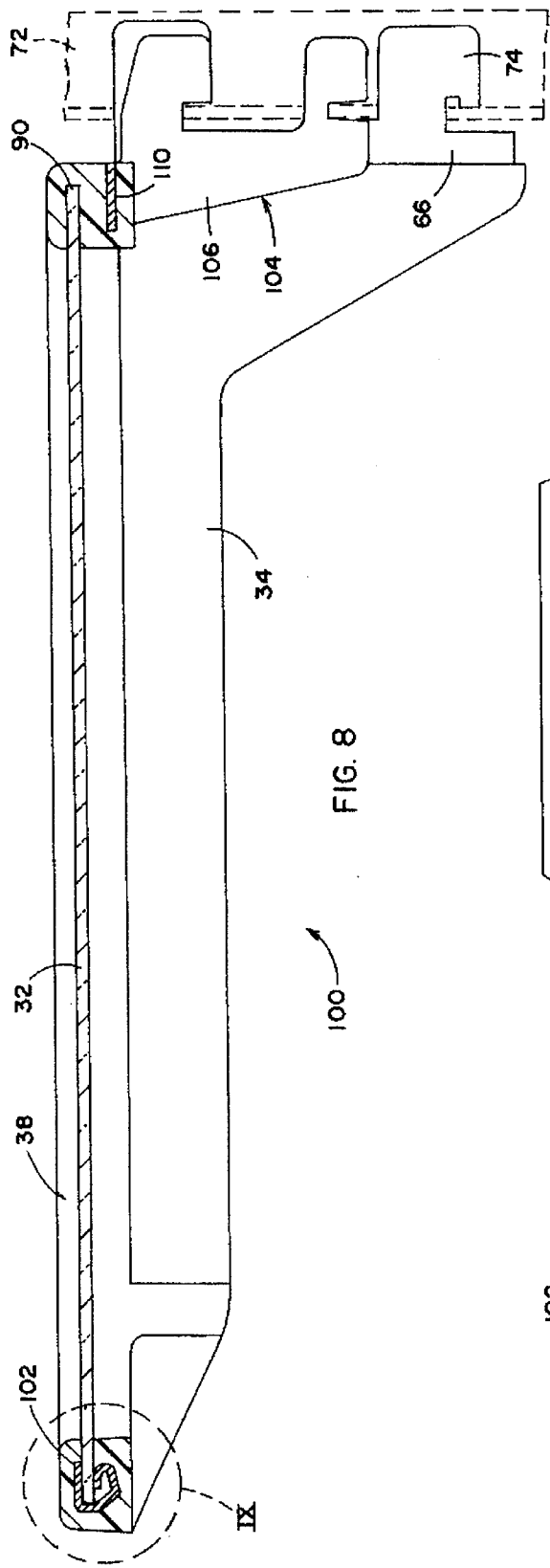
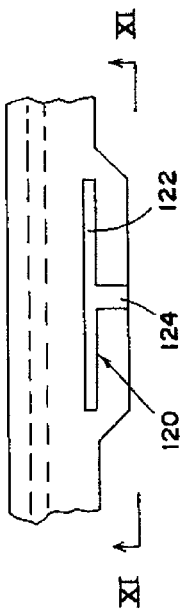
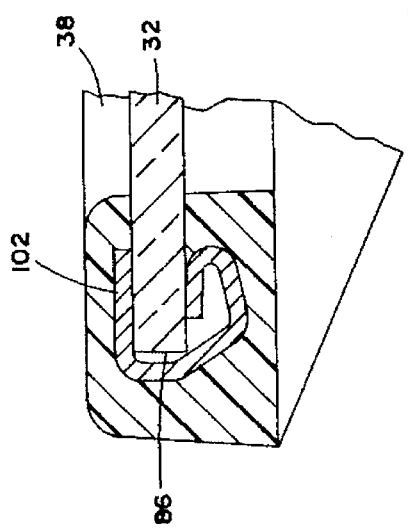
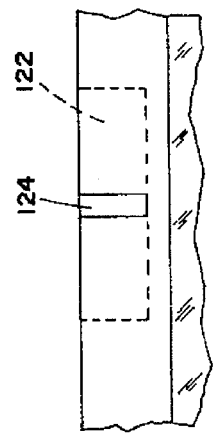

5,540,493

ENCAPSULATED SHELF WITH PRE-ENCAPSULATED BRACKET

CROSS-REFERENCE TO RELATED APPLICATION

This is: a continuation-in-part of U.S. patent application Ser. No. 07/665,661, entitled MOLDED REFRIGERATOR SHELF and filed on Mar. 7, 1991, by Bird et al., now U.S. Pat. No. 5,362,145 the disclosure of which is incorporated here by reference; and a continuation-in-part of copending U.S. patent application Ser. No. 08/241,133, still pending entitled ENCAPSULATED SHELF AND PROCESS FOR MAKING and filed on May 10, 1994, by Kane et al., the disclosure of which is incorporated here by reference.

BACKGROUND OF INVENTION

This invention relates to shelving and is particularly beneficial when used for refrigerator shelving and the like.

Articles containing liquid are spillable and, as is their nature, do spill. In the context of a refrigerator, such a spill will typically soak into other items and contaminate other foods. Extensive cleanup efforts will commonly be required for spills, which often flow downward from one shelf to another shelf. Containment measures for limiting the area of such a spill are, therefore, desirable. One such measure is a spill resistant shelf that contains a spill to the shelf upon which the spill occurs to minimize, if not preclude, downward flow of the spill.

Previously known spill resistant shelves include a shelf with a two-piece "picture frame" rim circumscribing the periphery of a shelf panel, which may commonly be made of glass or the like. A separate seal, such as a silicone gasket or the like, is commonly provided between the frame and the top of the glass panel for liquid spill resistance. Such prior known spill resistant shelves do not, however, resolve and may actually promote yet another problem, namely, sanitation. Items which are spilled upon such shelves commonly seep between the shelf panel and the surrounding frame to a location which is difficult, if not impossible, to clean. Thus, an unsanitary condition readily develops when food stuffs become trapped between the shelf panel and the frame members of the known shelf structures, even in spite of the sanitary benefits of using a glass panel, for example.

Another consideration in designing refrigerator shelving is the air circulation or convection through the compartment. Air circulation is desirable to maintain a homogenous temperature distribution and avoid thermal stratification in which a range of temperature zones develop in the compartment with the coldest zone at the bottom and the warmest zone at the top. Thus, the structure of an effective refrigerator design will typically include air passage spaces at either side of and behind each solid shelf panel.

Air passage spaces in a refrigerator directly decrease the available shelf surface area, however. Framing structures that surround refrigerator shelving as discussed above, also reduce available shelf area. A reduction in shelf area directly reduces the storage or holding capacity of the associated refrigerator, or freezer. While the reduction in shelf area attributable to air passage around the shelf perimeter is dictated by thermodynamic performance, however, the area lost to perimeter framing results from structural and design limitations imposed by accommodating the convenience of a spill resistant shelf.

Finally, ease of use and aesthetic considerations are important to today's purchasing market and are competitive elements for manufacturers. In response, designers are specifying uncluttered and bright visual appearances with simple, clean lines which enhance utility and appearance. Modular shelving systems which enhance versatility are also desired. Previously known shelf assemblies that are directed to these concerns typically include multiple parts, which are subject to loss and which require skilled or sophisticated labor to assemble, however. Further, cracks and crevices inherently defined between adjacent, assembled parts provide food traps and lead to sanitation or cleaning problems for the user as discussed above. Thus, there is clearly a need for a spill resistant shelf providing clean lines with ease of cleaning and modular adaptability to various storage tasks.

SUMMARY OF THE INVENTION

Accordingly, the present invention provides an encapsulated shelf assembly with pre-encapsulated bracket. The assembly has a panel with a panel edge; a support supporting the panel, the support having a support body; a cover encapsulating the support body; and a rim formed separately from the panel and formed around the panel edge and at least a portion of the support.

In one preferred aspect of the invention, the support body has at least one hole through the shelf support and a portion of the encapsulating cover extends into the at least one hole in the support body and mechanically fastens the cover with the support. In another preferred aspect of the invention, a slide rail to support a storage bin or drawer or the like is integrally formed in one piece with the encapsulating cover. In a further preferred aspect of the invention, the support has a flange with at least one hole extending through the flange, and the rim is formed around the flange with a portion of the rim extending into the at least one hole extending through the flange and mechanically fastening the rim with the support.

In another preferred aspect of the invention, the rim is a perimeter rim with a liquid resistant seal between the rim and the panel, that surrounds the panel. Further, the rim may project above a top surface of the panel to define a spill dam and contain to the panel, spills disposed upon the panel.

In a further preferred aspect of the invention, the support comprises a pair of brackets with one of the pair of brackets located at one of two opposing sides of the shelf assembly and the other of the pair of brackets located at the other of the two opposing sides of the shelf assembly. A third bracket may be located between the two brackets of the pair of brackets and may be coupled with the rim to further support the panel. Alternatively or in addition to the third bracket, a stiffening member may extend along a length of the panel, between the two brackets of the pair of brackets. The stiffening member may be an open-sided channel or the like coupled with a lengthwise edge of the panel.

These and other features, objects, and benefits of the invention will be recognized by those who practice the invention and by those skilled in the art, from the specification, the claims, and the drawing figures.

BRIEF DESCRIPTION OF THE DRAWINGS

FIG. 2 is a cross-sectional view along section line II—II of FIG. 1;

FIG. 3 is a cross-sectional view along section line III—III of FIG. 1;

FIG. 8 is a cross-sectional view along section line VIII—VIII of FIG. 7;

FIG. 9 is an enlarged view of detail IX of FIG. 8;

FIG. 10 is a fragmentary rear elevational view of the center portion of the shelf of FIG. 7 with the center bracket removed;

FIG. 11 is a fragmentary bottom plan view of the shelf portion shown in FIG. 10;

DETAILED DESCRIPTION OF THE PREFERRED EMBODIMENTS

Figure 1:
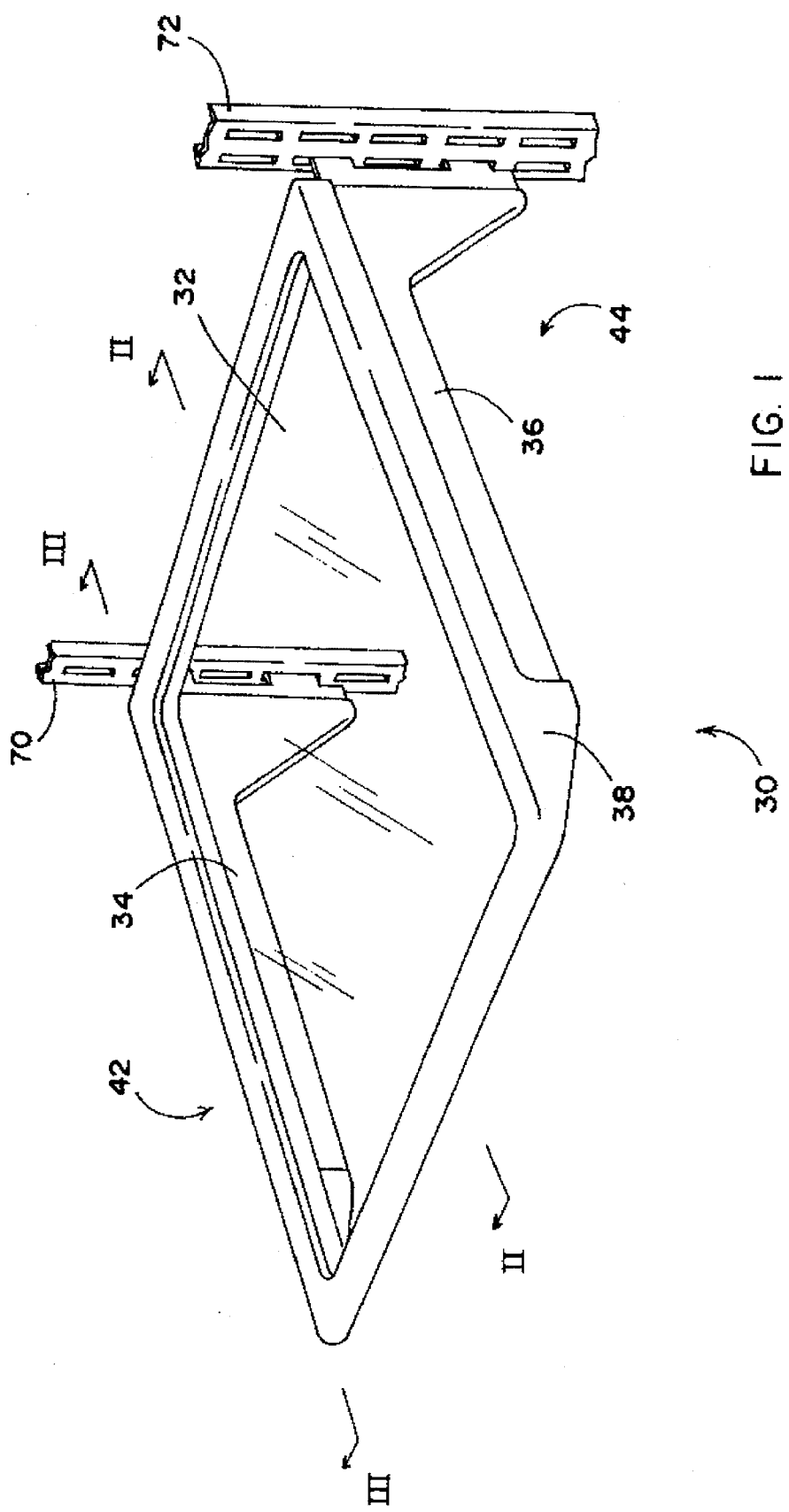
FIG. 1 is a perspective view of a shelf according to the invention.

Referring to the drawing figures in greater detail, and FIGS. 1–4 in particular, a shelf assembly 30 according to the present invention comprises a generally planar shelf panel 32, pre-encapsulated support brackets 34 and 36, and a one piece perimeter rim member 38. Shelf assembly 30 is preferably cantilevered forward by brackets 34 and 36 from a generally vertical surface, such as the rear wall of a refrigerator or the like. Shelf assembly 30 may also be adapted for other support structures, such as a sidewall for example. Shelf assembly 30 is preferably sized to provide air circulation space between the shelf assembly and adjacent vertical surfaces of the refrigerator for proper circulation to minimize thermal stratification.

Shelf panel 32 may be any suitable shelving material, including a light transmitting material, for example, and is preferably about 3.3 mm (0. 130 inch) thick, optically clear, tempered glass, as is commonly required for refrigerator shelving, to enhance light distribution and minimize shadows cast from shelf assembly 30. Shelf panel 32 is preferably located above brackets 34 and 36 at two opposing sides 42 and 44, respectively, of shelf assembly 30. Brackets 34 and 36 are mirror image replicas of one another and are uniformly incorporated in shelf assembly 30. Thus, bracket 34 will be discussed in greater detail with the understanding that the discussion applies equally to bracket 36.

Figure 4:
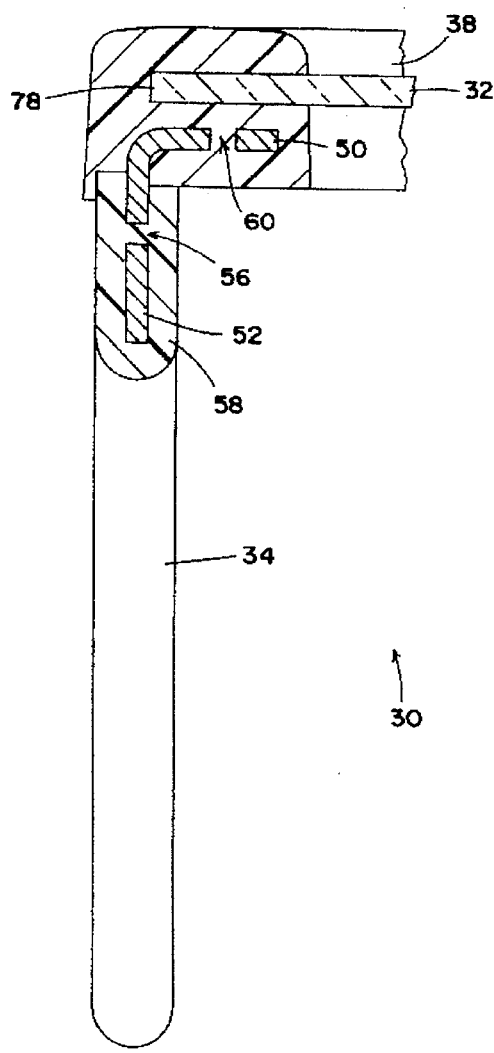
FIG. 4 is a fragmentary cross-sectional view along section line IV—IV of FIG. 3.
Figure 5:
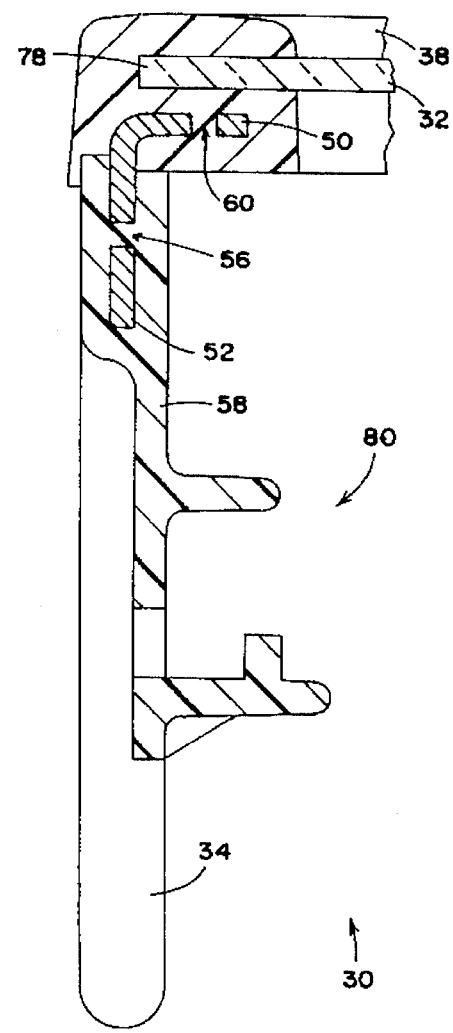
FIG. 5 is the view of FIG. 4 showing an alternative bracket configuration.

As shown in FIG. 4, a flange portion 50 projects inwardly at a top edge of a generally vertical web portion 52 of bracket 34. Web 52 is provided with a series of fastening holes 56 (FIG. 3) to mechanically connect bracket 34 with a one piece encapsulating cover 58 (FIGS. 3–5), as will be discussed in greater detail below. Flange 50 is also provided with a series of fastening holes 60 (FIGS. 3 and 4) to mechanically connect bracket 34 with rim 38, as will also be discussed further below. Support bracket 34 may be fabricated of conventional materials by conventional methods as is well known for adjustable shelving brackets. For a refrigerator environment, bracket 34 is most preferably about fourteen gage (1.98 mm, 0.0781 inch) steel and may optionally be provided with a powder coat finish. One such finishing product, which performs well and is readily available, is commonly known as Herberts Epoxy Polyester 071-30-06 White, available from Herberts Powder Coatings, Inc. of Hilliard, Ohio.

While shelf assembly 30 may be used as a fixed shelf, shelf assembly 30 is preferably used as a vertically adjustable shelf. Bracket 34 is therefore provided with a mount portion 66 (FIGS. 2 and 3). Mount 66 is adapted to releasably engage generally vertically oriented, adjustable shelf tracks 70 and 72 (FIG. 1) at a plurality of vertically spaced positions as is commonly known and practiced for refrigerator shelving. Thus, mount 66 is preferably formed with hooks 74 to engage rungs 76 in track 70 or 72 (FIGS. 1–3).

Encapsulating cover 58 is most preferably formed in one piece as an about 2 mm (0.0787 inch) thick sheathing around at least a significant majority of bracket 34, namely, a body portion 64 (FIGS. 1–3). Cover 58 is formed from any suitable moldable material, including, but not limited to plastics such as ABS, polyvinyl chloride, or copolymers of ethylene and polypropylene, for example. One readily available material which performs well and meets FDA regulations for food packaging applications is Tenite® Polypropylene P5M4K-007, available from Eastman Chemical Products, Inc., a marketing affiliate of Eastman Kodak Company. A coloration pigment may be added to the moldable material from which cover 58 is formed in order to provide desired colors. Titanium dioxide may be added for a white coloration for example. In a refrigerator shelf application of the invention, the materials used must, of course, be FDA approved for food contact.

One piece perimeter rim member 38 encapsulates a perimeter edge 78 (FIG. 4) of panel 32, encapsulates at least flange 50 of each support bracket 34 and 36, extends into flange fastening holes 60, and provides a tight connection between panel 32 and the brackets 34, 36. Most preferably, rim 38 encapsulates edge 78 in liquid resistant, sealing engagement. One will appreciate that rim 38 and cover 58 may be formed of the same material or may be formed of materials having contrasting or complementary properties, such as differing temperature melting points for example, depending upon the characteristics desired. By the choice of materials for rim 38 and cover 58, relative to one another, rim 38 and cover 58 may be fused or effectively welded together. Rim 38 and cover 58 may also be formed as separate parts with a liquid resistant seal between them, for example.

Rim 38 is most preferably a perimeter rim which surrounds panel 32 at perimeter edge 78 and extends above a top surface of shelf panel 32 to define a spill dam and contain spills disposed upon shelf panel 32 (FIGS. 1–4) as disclosed in commonly assigned U.S. patent application Ser. No. 07/665,661, now U.S. Pat. No. 5,362,145 entitled MOLDED REFRIGERATOR SHELF and filed on Mar. 7, 1991, by Bird et al. now U.S. Pat. No. 5,362,145, the disclosure of which is incorporated here by reference. By molding rim 38 about perimeter edge 78, a liquid resistant seal is created between shelf panel 32 and rim 38 to minimize, if not entirely preclude, seepage of spills between shelf panel 32 and rim 38. Depending upon the specific material used to form rim 38, the seal may be enhanced by coating perimeter edge 78, including the edge surface and adjoining portions of the top and bottom surfaces of shelf panel 32, with a primer layer of a cooperating material that promotes and facilitates adhesion of rim 38 to shelf panel 32, prior to forming rim 38 about perimeter edge 78.

Figure 6:
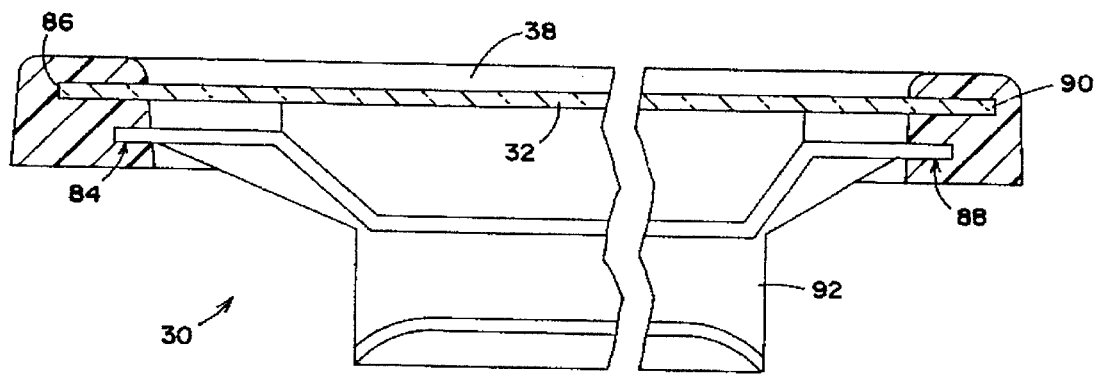
FIG. 6 is a cross-sectional view along section line II—II of FIG. 1 showing an optional slide support member.

As disclosed in commonly assigned U.S. Pat. No. 5,273,354, entitled MOLDED REFRIGERATED SHELF AND SUPPORT BRACKET and issued on Dec. 28, 1993, to Herrmann et al., the disclosure of which is incorporated here by reference, a slide guide may be attached by use of fasteners at spaced positions along the length of each support bracket 34 and 36. Alternatively, a slide guide 80 (FIG. 5) may be molded into each support bracket 34 and 36 as a part of cover 58 when pre-encapsulating the support brackets. Additional storage device attachment may be provided by forming at least one front receptacle 84 (FIG. 6) in rim 78 at a front edge 86 of shelf panel 32 and at least one cooperating back receptacle 88 in rim 78 at a back edge 90 of shelf panel 32 and coupling a separate slide 92 with perimeter edge member 78 at the front and back slide receptacles 84 and 88, respectively, as disclosed in greater detail in commonly assigned U.S. patent application Ser. No. 07/912,778 now abandoned, entitled MOLDED REFRIGERATOR SHELF WITH SNAP-IN SLIDE and filed on Jul. 13, 1992, by Kane et al. now U.S. Pat. No. 5,403,084, the disclosure of which is incorporated here by reference.

Figure 14:
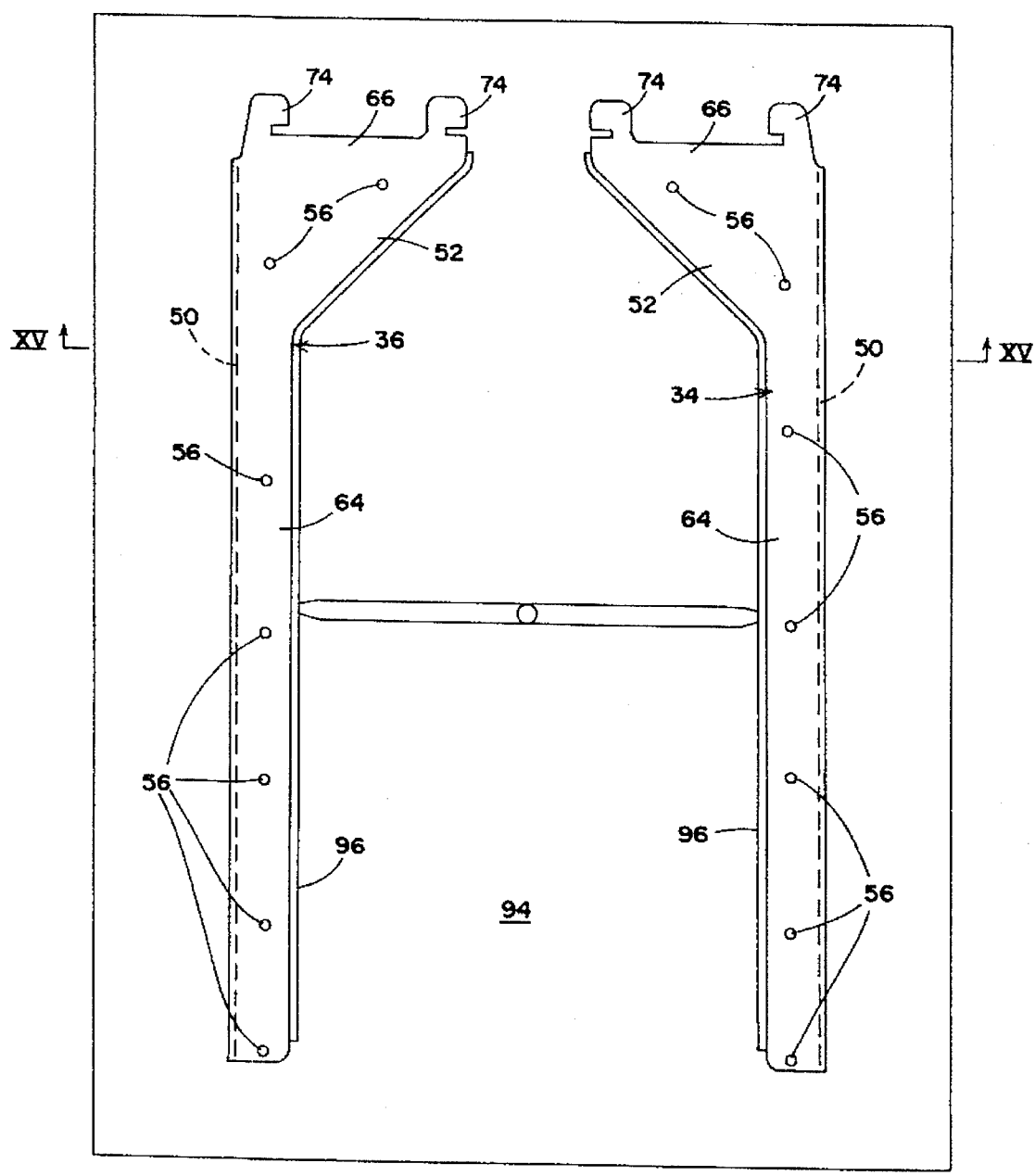
FIG. 14 is a plan view of a mold for pre-encapsulating the support brackets, showing the support brackets positioned for encapsulation.
Figure 15:
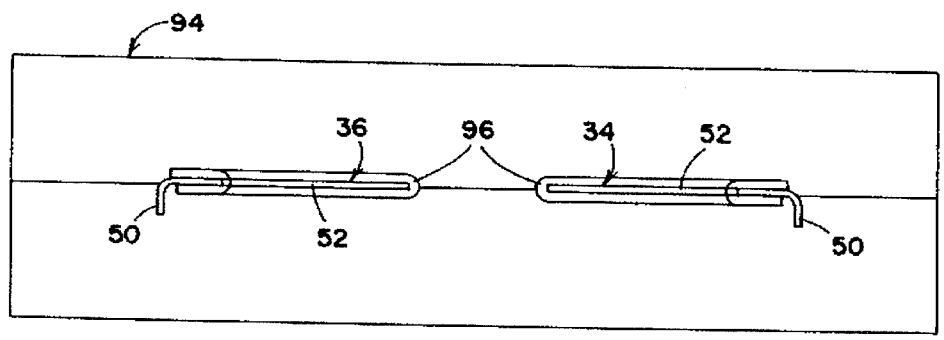
FIG. 15 is a cross-sectional view along section line XV—XV of FIG. 14.

Each of support brackets 34 and 36 is conveniently pre-encapsulated with cover 58 and optionally include slide guide 80 by conventionally known molding technology. The flange 50 and mount 66 of a bracket 34 or 36 may be securely clamped in an appropriate mold 94 (FIGS. 14 and 15) with body 64 extending into a cavity 96 of the mold. Depending upon the particular result desired, an end of body 64, opposite end mount 66, may also be clamped in the mold. With the mold 94 closed around bracket 34 or 36, the mold cavity 96 is filled with the moldable material to form encapsulating cover 58. As the cavity is filled, the material will flow around support body portion 64 and through fastening holes 56 of web 52. Once the moldable material sets, the resulting encapsulated support bracket 34 or 36 is removed from the mold and put aside to await assembly into shelf assembly :30.

Figure 16:
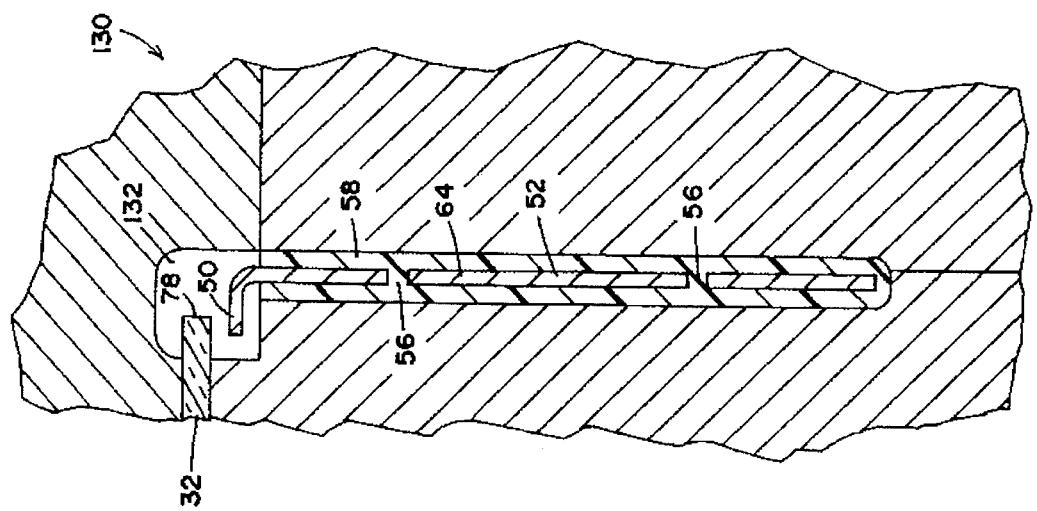
FIG. 16 is an enlarged fragmentary cross-sectional view of a mold for making a shelf assembly according to the invention.

Shelf assembly 30 may also be fabricated by commonly known molding methods. The shelf panel 32 and support brackets 34 and 36 are positioned and clamped within an appropriate mold 130 (FIG. 16) so perimeter edge 78 of shelf panel 32 and flanges 50 of brackets 34 and 36 project into a mold cavity 132 that defines perimeter rim 38. The flange 50 of each support bracket 34 and 56 is preferably positioned in alignment with and spaced from the perimeter edge 78 of shelf panel 32 at opposing sides 42 and 44 of the resulting shelf assembly 30. With the shelf panel 32 and support brackets 34 and 36 secured in the mold 130 and the mold closed, the mold cavity 132 is filled with the moldable material to form one piece rim member 38. As the moldable material forming rim 38 flows into the mold cavity, the material flows around perimeter edge 78 of shelf panel :32, flows around flanges 50 of the support brackets 34 and 36, and flows into flange fastening holes 60. Depending upon the materials chosen for each of cover 58 and rim 38, the rim and cover may fuse together where the rim 38 and cover 58 meet. Rim 38 and cover 58 may also abut in a liquid resistant seal. One will appreciate that this construction aspect of the invention will allow a designer to insert an accent strip between the cover 58 and rim 38, or the like. After the mold cavity 132 is filled and the moldable material is allowed to set, shelf assembly 30 may be removed from mold 130.

Figure 7:
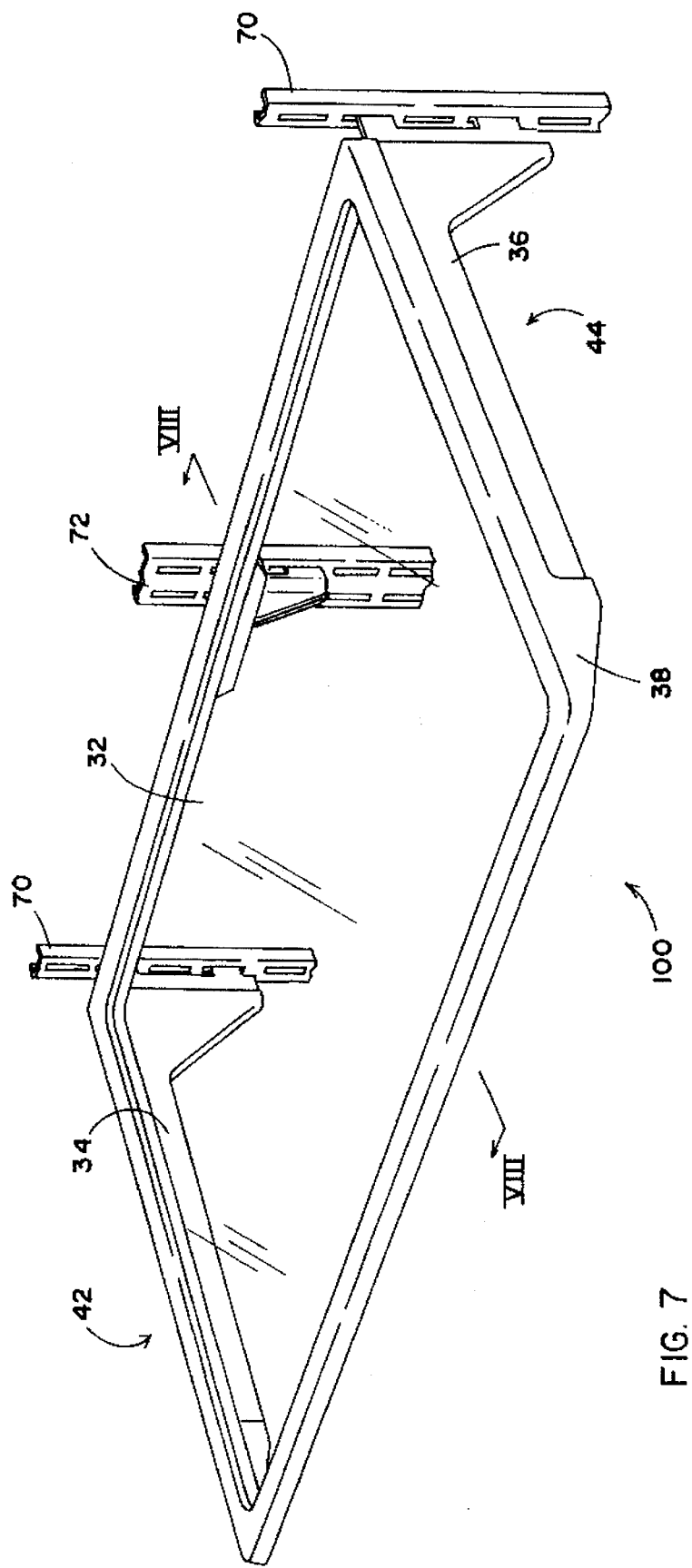
FIG. 7 is a perspective view of an alternative, wide embodiment of a shelf according to the invention.

Shelf assembly 30 may be a relatively narrower shelf assembly for use in the relatively narrower compartments of a side-by-side refrigerator or as a partial width shelf in a compartment of a top or a bottom mount refrigerator as is disclosed in greater detail in commonly assigned U.S. patent application Ser. No. 07/989,087, now abandoned entitled ADJUSTABLE REFRIGERATOR SHELVING and filed on Dec. 11, 1992, by Bird et al., the disclosure of which is incorporated here by reference. Shelf assembly 30 may also be a relatively wider shelf assembly as is more specifically shown in FIG. 7 as an elongated shelf assembly 100, provided according to the invention for a full width shelf in a top or a bottom mount refrigerator or the like. Since elongated shelf assembly 100 is substantially similar to shelf assembly 30 and differs primarily in its length and in considerations relating to its length, the same reference numerals will be used to discuss elongated shelf assembly 100 as were used for the same elements of shelf assembly 30.

Because of the extended width of shelf assembly 100, anti-sagging reinforcement may be included. Thus, shelf assembly 100 may further be provided with a stiffening channel 102 (FIGS. 8 and 9) at front edge 86 of shelf panel 32. Stiffening channel 102 may be extruded or otherwise formed from "1018" cold-rolled steel or the like to create an elongated, open-sided channel member, sized to snugly slip-fit over front edge 86.

While stiffening channel 102 is depicted in the drawing figures with a stylized "G" section or profile, one will appreciate the fact that numerous alternative profiles, including, but not limited to, "E", "F", and "S" or "Z" shapes, for example, may be used to develop a required section modulus along front edge 86 of shelf panel 32 to resist vertical loading deflection and, ultimately, vertical loading fracture or failure of the shelf. One will also appreciate that stiffening channel 102 may be formed of various, readily available structural materials, including, plastics as well as metals, for example, and may be formed by various, readily available methods. To minimize potential corrosion of metal stiffening channel 102, a coating of iron phosphate may be applied to the channel, for example. Alternatively, the channel may be E-coated according to common automotive industry finishing standards, including, an ionized washed steel process, a zinc phosphate dip, electrostatic painting with an epoxy powder coat finish or the like, and curing or baking at about three hundred eighty to four hundred ten degrees Fahrenheit as may be required.

While a stiffening channel 102 may also be provided along back edge 90 of shelf panel 3;2, a center support bracket 104 (FIGS. 8, 12 and 13) is preferably provided instead. Bracket 104 may be conveniently formed from two symmetrical or mirror image pieces stamped from about sixteen gage steel and spot welded together, for example. For refrigerator shelving use, bracket 104 may also be provided with a white powder-coat finish as discussed in greater detail above regarding shelf support brackets 34 and 36.

Bracket 104 has a body or web portion 106 which extends rearward to a double hook arrangement 108 that is adapted to mate with two row adjustable shelf track 72 (FIG. 7) or the like that is commonly found as a center of three shelf tracks provided in contemporary top or bottom mount refrigerators. Of course, the configuration of bracket 104 in consideration of releasable engagement with an adjustable shelf track will be dictated by the particular shelving arrangement and, specifically, the shelf track with which bracket 104 will releasably couple.

Figure 13:
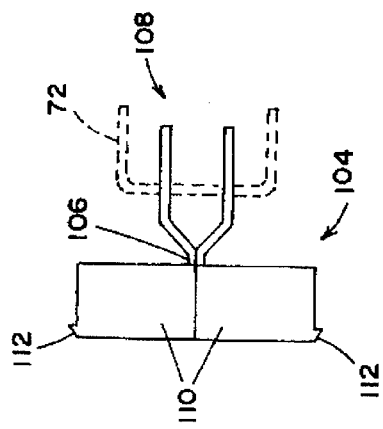
FIG. 13 is a top plan view of the bracket of FIG. 12.
Figure 12:
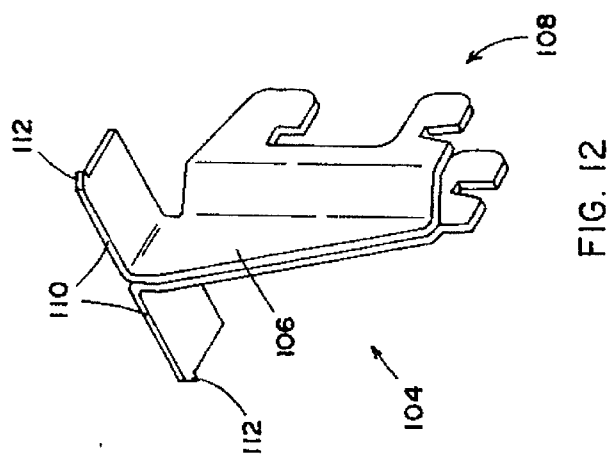
FIG. 12 is a lower perspective view of the center bracket of the shelf of FIG. 7.

In front elevation, bracket 104 presents a general T-shape with a pair of opposing flanges 110 extending from a top edge of the body portion 106 or web portion (FIGS. 12 and 13). Each flange 110 is provided with a locking device, such as a barb 112, for example, to resist withdrawal of bracket 104 from the molded rim 38 of shelf assembly 100 after assembly of bracket 104 with shelf assembly 100.

A cooperating downward and rearward opening bracket slot 120 (FIGS. 10 and 11) is provided in rim 38 and generally centered along back edge 90 of shelf assembly 100. Bracket slot 120 has a cooperating main slot or horizontal portion 122 oriented generally parallel to shelf panel :32 and spaced vertically below the shelf panel to receive flanges 110. Horizontal slot 122 opens to the back of shelf assembly 100 and is sized for force-fit engagement with flanges 110 to assure that the locking device of bracket 104, namely, barbs 112 in the embodiment shown, is effective in securing bracket 104 and resisting disassembly. Bracket slot 120 also has a stem portion 124 extending and opening generally downward from horizontal slot 122 to accept the web or body 106 of bracket 104 when flanges 110 engage and seat in horizontal slot 122.

The extended length shelf assembly 100 may use the same pre-encapsulated shelf support brackets 34 and 36 which are discussed in detail above, including the option of molding in a slide guide 80 or otherwise providing additional, under-shelf storage as is also discussed above. Shelf assembly 100 may also be fabricated by commonly known molding methods discussed above regarding shelf assembly 30.

It will be generally understood by those who practice the invention and by those skilled in the art, that various other modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A refrigerator shelf assembly comprising:

a panel, said panel having a panel edge;

a support, said support supporting said panel, said support having a support body;

a cover, said cover encapsulating said support body; and a rim formed separately from said panel, said rim being formed around said panel edge and at least a portion of said support.

2. The refrigerator shelf assembly defined in claim 1, wherein said support body has at least one hole extending through said support body and wherein said cover has a portion that extends into said at least one hole in said support body and mechanically fastens said cover with said support.

3. The refrigerator shelf assembly defined in claim 2, wherein said support also has a flange extending from said support body, said flange having at least one hole extending through said flange, and wherein said rim is formed around said flange with a portion of said rim extending into said hole in said flange and mechanically fastening said rim with said support.

4. The refrigerator shelf assembly defined in claim 3, wherein said shelf assembly also includes a slide guide integrally formed in one piece with said cover.

5. The refrigerator shelf assembly defined in claim 1, wherein said support also has a flange extending from said support body, said flange having at least one hole extending through said flange, and wherein said rim is formed around said flange with a portion of said rim extending into said hole in said flange and mechanically fastening said rim with said support.

6. The refrigerator shelf assembly defined in claim 1, wherein said shelf assembly also includes a slide guide integrally formed in one piece with said cover.

7. The refrigerator shelf assembly defined in claim 1, wherein said support also has a support mount, said support mount releasably coupling with an interior surface of a refrigerated compartment at a plurality of vertically spaced positions.

8. The shelf assembly defined in claim 1, wherein said panel edge is a perimeter edge surrounding said panel and wherein said rim encapsulates said perimeter edge and defines a perimeter rim surrounding said panel.

9. The shelf assembly defined in claim 8 further including means for liquid resistant sealing between said panel and said rim.

10. The shelf assembly defined in claim 9, wherein said panel is glass and said rim is formed of a moldable material.

11. The shelf assembly defined in claim 8, wherein said rim defines at least one front receptacle at a front edge of said panel and at least one back receptacle at a back edge of said panel and wherein said shelf assembly further includes at least one slide device to receive and support a separate article in sliding engagement under said panel, said slide device being removably coupled with each of said front receptacle and said back receptacle.

12. The shelf assembly defined in claim 8, wherein said shelf support includes a bracket, said bracket being coupled with said perimeter edge of said panel by said rim.

13. The shelf assembly defined in claim 12, wherein said bracket has a flange and said rim has a cooperating slot, said flange being captured in said slot.

14. The shelf assembly defined in claim 1, wherein said panel has two opposing panel edges, said shelf support includes two elongated brackets, one of said two brackets being generally parallel with one of said two opposing panel edges, the other of said two brackets being generally parallel with the other of said two opposing panel edges.

15. The shelf assembly defined in claim 14, wherein said shelf support includes a third bracket, said third bracket being positioned between said two brackets, said third bracket being coupled with said perimeter edge of said panel by said rim.

16. The shelf assembly defined in claim 15, wherein said third bracket has a flange and said rim has a cooperating slot, said flange being captured in said slot.

17. The shelf assembly defined in claim 1, wherein said shelf assembly also includes a panel stiffening member extending along a length of said panel edge.

18. The shelf assembly defined in claim 17, wherein said panel stiffening member has an elongated body defining an open-sided channel and said panel edge is positioned in said open-sided channel.

19. The shelf assembly defined in claim 18, wherein said panel is glass and said rim is formed of a moldable material.

20. The shelf assembly defined in claim 1, wherein said rim abuts said cover in liquid resistant sealing engagement.

21. A refrigerator shelf assembly comprising:

a panel, said panel having a panel edge;

a support, said support supporting said panel, said support having a support body and having at least two holes extending through said support;

a cover, said cover encapsulating said support body, said cover having a portion extending into one of said at least two holes extending through said support; and a rim formed separately from said panel, said rim being formed around said panel edge and at least a portion of said support, said rim having a portion that extends into another of said at least two holes extending through said support and mechanically fastens said rim with said support.

22. The refrigerator shelf assembly defined in claim 21, wherein said shelf assembly also includes a slide guide integrally formed in one piece with said cover.

23. The shelf assembly defined in claim 21, wherein said panel edge is a perimeter edge surrounding said panel and wherein said rim encapsulates said perimeter edge and defines a perimeter rim surrounding said panel.

24. The shelf assembly defined in claim 23 further including means for liquid resistant sealing between said panel and said rim.

25. The shelf assembly defined in claim 21, wherein said rim abuts said cover in liquid resistant sealing engagement.

26. The shelf assembly defined in claim 21, wherein said panel has two opposing panel edges, said shelf support includes two elongated brackets, one of said two brackets being generally parallel with one of said two opposing panel edges, the other of said two brackets being generally parallel with the other of said two opposing panel edges.

27. The shelf assembly defined in claim 26, wherein said shelf support includes a third bracket, said third bracket being positioned between said two brackets, said third bracket being coupled with said perimeter edge of said panel by said rim.

28. The shelf assembly defined in claim 21, wherein said shelf assembly also includes a panel stiffening member extending along a length of said panel edge.

29. The shelf assembly defined in claim 21, wherein said panel is glass, said rim is formed of a moldable material, and said cover is formed of a moldable material.

30. A refrigerator shelf assembly comprising:
   a panel, said panel having a panel edge surrounding said panel, a first panel side, and an opposing second panel side;
   a first support supporting said panel, said first support being positioned near said first panel side, said first support having a first support body;
   a first cover, said first cover encapsulating said first support body;
   a second support supporting said panel, said second support being positioned near said second panel side, said second support having a second support body;
   a second cover, said second cover encapsulating said second support body; and
   a rim formed separately from said panel, surrounding a perimeter of said panel, and formed around said panel edge and around at least a portion of each of said first support and said second support.

31. The refrigerator shelf assembly defined in claim 30, wherein said shelf assembly also includes a slide guide integrally formed in one piece with at least one of said first cover and said second cover.

32. The shelf assembly defined in claim 30 further including means for liquid resistant sealing between said panel and said rim.

33. The shelf assembly defined in claim 30, wherein said rim abuts said cover in liquid resistant sealing engagement.

34. The shelf assembly defined in claim 30, wherein said shelf support includes a third bracket, said third bracket being positioned between said two brackets, said third bracket being coupled with said perimeter edge of said panel by said rim.

35. The shelf assembly defined in claim 30, wherein said shelf assembly also includes a panel stiffening member extending along a length of said panel edge.

36. The shelf assembly defined in claim 35, wherein said panel stiffening member has an elongated body defining an open-sided channel and said panel edge is positioned in said open-sided channel.

37. The shelf assembly defined in claim 30, wherein each of said first support and said second support has at least two holes extending through said support.

38. The shelf assembly defined in claim 37, wherein said first cover has a portion that extends into one of said at least two holes extending through said first support and wherein said second cover has a portion that extends into one of said at least two holes extending through said second support.

39. The shelf assembly defined in claim 38, wherein said rim has a portion that extends into another of said at least two holes extending through said first support and mechanically fastens said rim with said first support and has a portion that extends into another of said at least two holes extending through said second support and mechanically fastens said rim with said second support.

40. The shelf assembly defined in claim 37, wherein said rim has a portion that extends into one of said at least two holes extending through said first support and mechanically fastens said rim with said first support and has a portion that extends into one of said at least two holes extending through said second support and mechanically fastens said rim with said second support.

* * * * *